Figure 1:
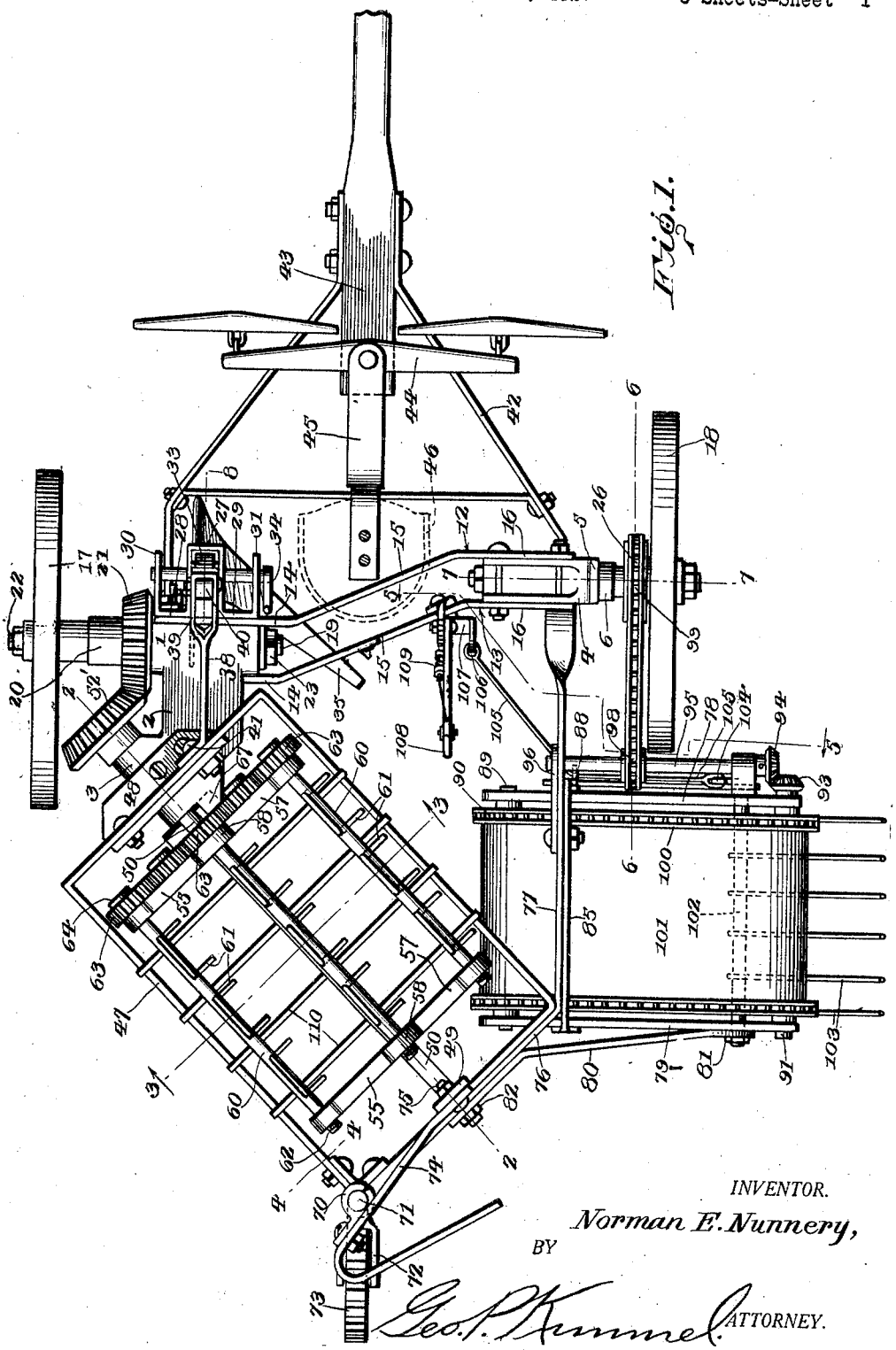

Dec. 3, 1929.  N. E. NUNNERY  1,738,388
HARVESTING MACHINE
Filed March 28, 1927  3 Sheets-Sheet 1

INVENTOR.
Norman E. Nunnery,
BY
Geo. P. Kummel ATTORNEY.

Dec. 3, 1929.  N. E. NUNNERY  1,738,388
HARVESTING MACHINE
Filed March 28, 1927  3 Sheets-Sheet 2

INVENTOR.
Norman E. Nunnery,
BY
Geo. P. Kimmel, ATTORNEY.

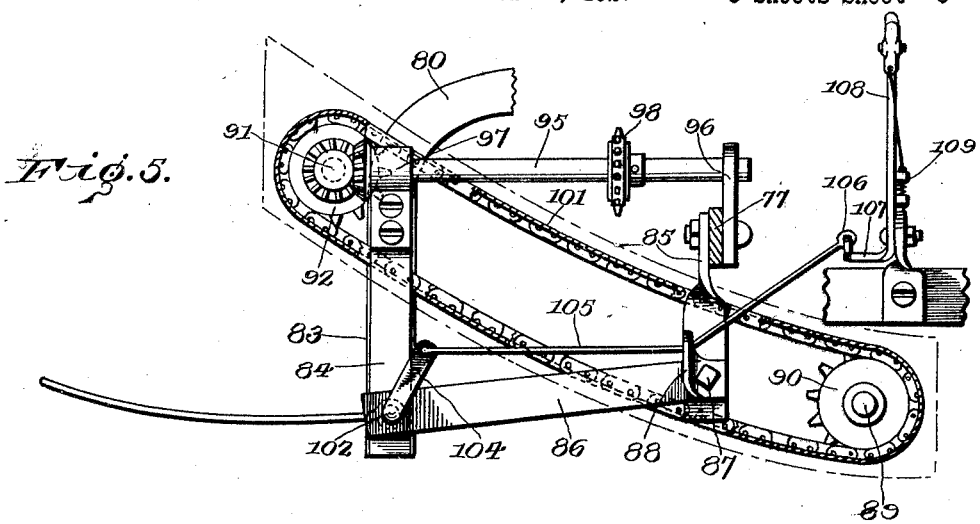

Patented Dec. 3, 1929

1,738,388

UNITED STATES PATENT OFFICE

NORMAN E. NUNNERY, OF HEADLAND, ALABAMA

HARVESTING MACHINE

Application filed March 28, 1927. Serial No. 179,107.

This invention relates to a harvesting machine, designed primarily for use in connection with the harvesting of peanuts, but it is to be understood that a machine, in accordance with this invention can be employed for any purposes for which it is found applicable, and the invention has for its object to provide, in a manner as hereinafter set forth, a machine of the class referred to and during the travel thereof operated to successively dig up the plants, rake the plants upon a conveyor, the latter functioning to transport the plants into a dumping carrier, and with the latter manually operated at predetermined intervals to dump the plants in piles laterally at the right of the line of draft of the machine.

Further objects of the invention are to provide, in a manner as hereinafter set forth, a mobile harvesting machine capable of being drawn by tractor or horse power, and which is simple in its construction and arrangement, strong, durable, compact, thoroughly efficient in its use, readily assembled and comparatively inexpensive to set up.

With the foregoing and other objects in view the invention consists of the novel construction, combination and arrangement of parts, as hereinafter more specifically described and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a top plan view of a harvesting machine in accordance with this invention.

Figure 2:
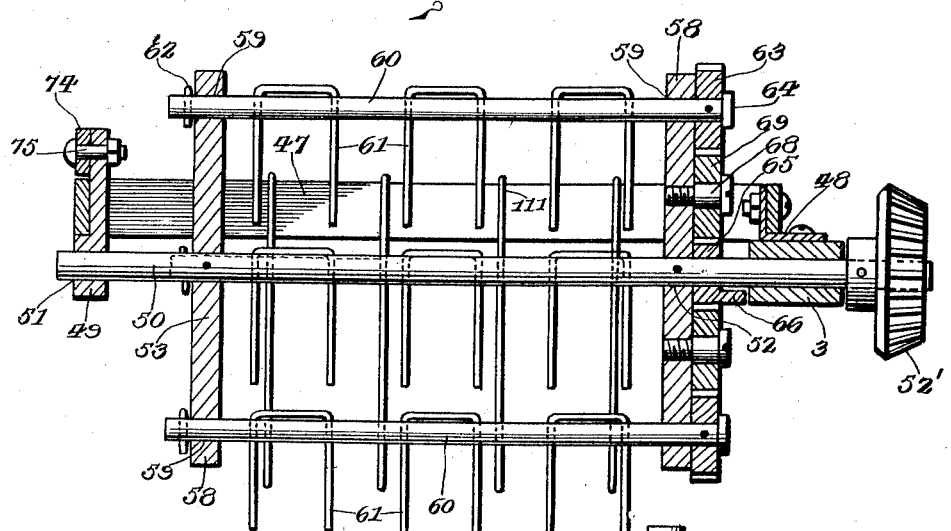
Figures 3, 4:
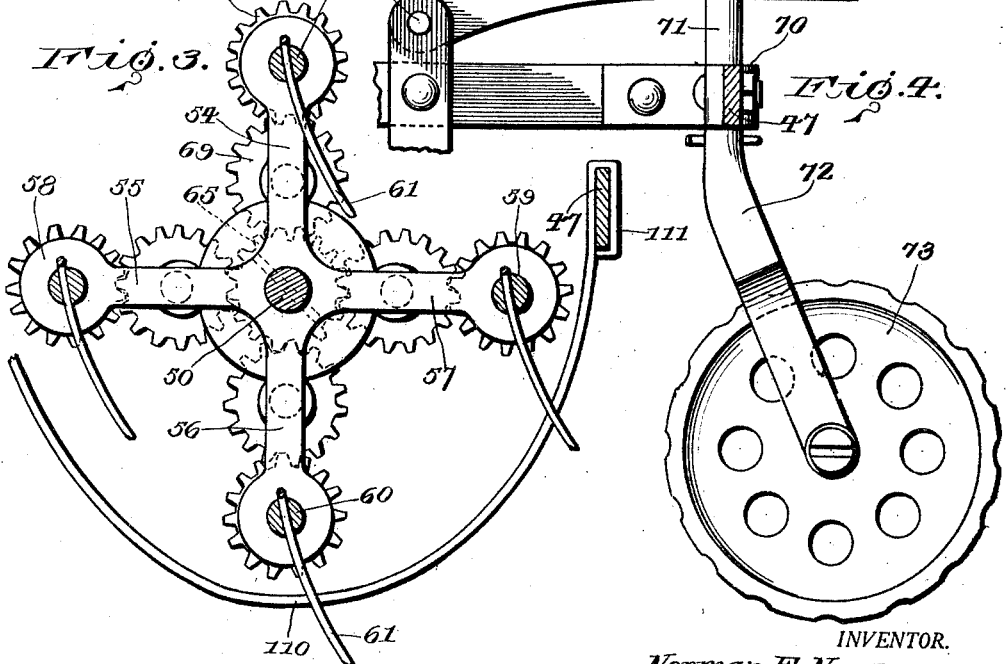

Figure 2 is a section on line 2—2 Figure 1.
Figure 3 is a section on line 3—3 Figure 1.
Figure 4 is a section on line 4—4 Figure 1.
Figure 5 is a section on line 5—5 Figure 1.
Figure 6 is a section on line 6—6 Figure 1.
Figure 7 is a section on line 7—7 Figure 1.
Figure 8 is a section on line 8—8 Figure 1.

The body portion of the machine includes a left casting formed of a rectangular forward part 1, a rearwardly extending intermediate part 2 of a width less than the length of the forward part 1, and an angularly disposed rear part 3, extending outwardly with respect to the intermediate part 2 and disposed at an inclination inwardly from its outer towards its inner end. The forward part 1 extends upwardly and inwardly with respect to the forward end of the intermediate part 2.

The body portion further includes a right casting 4 which is arranged in advance of and spaced from the left casting referred to. The casting 4 at its outer end is provided with an extension 5 and positioned against the outer face or rather outer end of the left casting 4 is a vertically adjustable support 6 formed with an opening 7 and a vertically disposed slot 8 positioned a substantial distance below said opening 7. The casting 4 is provided in its lower part with a lengthwise extending slot 9 through which passes a bolt 10, carrying a clamping nut 11. The bolt 10 extends through the slot 8 and provides means in connection with the nut 11 for clamping the support 6 against the outer end of the casting 4. The slot 8, in connection with the bolt 10 also provides means for adjustably securing the support 6 to the casting 4.

The body portion further includes a pair of coupling members for the right and left castings and one of said members is arranged forwardly of and secured to the castings and the other of said members is arranged rearwardly of and secured to the castings. The coupling members are indicated at 12, 13 and each of them includes an end portion 14, an inclined intermediate portion 15 and an end portion 16. The end portions 14 of the coupling members 12, 13 are positioned rearwardly with respect to the end portions 16 of said members. The end portion 14 of the member 12 is secured to the front of the rectangular part 1 of the left casting and the end portion 16 of the member 12 is secured to the front of the right casting 4. The end portion 14 of the member 13 is secured to the rear of the front part 1 of the left casting and below the intermediate part 2 of said casting and the end portion 16 of the member 13 is secured to the rear of the casting 4. Suitable holdfast devices are provided for securing the coupling members to the castings.

The body portion of the machine is of the mobile type and further includes a pair of supporting wheels 17, 18 and with the latter positioned in advance of the former. The wheel 17 is fixedly secured to an axle member 19 which extends through and is rotatable within the forward part 1 of the left casting. The axle member 19 projects a substantial distance from the left casting and has fixedly secured thereto, so as to revolve therewith, the hub 20 of a bevelled gear 21. The hub and gear are arranged between the wheel 17 and the forward part 1 of the left casting. Securing means for the wheel 17, is mounted on the outer end of the axle 19, and is indicated at 22 and securing means for the inner end of the axle member 19, is indicated at 23. The securing means 22 and 23 prevent the lengthwise shifting of the axle member 19 relative to the forward part 1 of the left casting and the hub 20 of the gear 21 extends to the wheel 17 whereby the shifting of the gear 21 lengthwise of the axle member 19 is prevented. The wheel 18 is revolubly mounted on a fixed spindle 24 which is positioned within the opening 7 and is fixedly secured to the bracket 6 as well as projecting outwardly therefrom. Securing means for the wheel 18, to prevent it from moving outwardly off the spindle 24, is indicated at 25. Connected to the wheel 18 so as to bodily revolve therewith, is a sprocket wheel 26 and the function of which will be presently referred to.

Arranged rearwardly of the body portion of the machine are a raking mechanism, a conveyor mechanism and a dumping carrier. Positioned forwardly with respect to and carried by the left casting is a digger device which is vertically adjustable.

The digger device includes a supporting bracket consisting of a yoke-shaped part 27 extending forwardly from the part 1 and open at its rear, the yoke-shaped part 27 is disposed lengthwise with respect to the machine. The supporting bracket further includes a pair of oppositely disposed horizontal arms 28, 29 extending from the inner end of the yoke shaped part 27, and a pair of longitudinally disposed end arms 30, 31 which project forwardly from the horizontal arms. The horizontal arms 28, 29 are positioned against the forward face of the end portion 14 of the connecting member 12. The holdfast devices employed for connecting the end portions 14 of the coupling members 12 and 13 to the part 1 of the left casting are also employed for securing the supporting bracket against the forward face of the end portion 14 of the coupling member 12. The yoke shaped part 27 and end arms 30, 31 of the supporting bracket are provided with aligning openings through which extend a rotatable shaft 32 having fixedly secured thereto, so as to rotate therewith a pinion 33 which is positioned in the forward portion of the yoke shaped part 27 of the supporting bracket, see Figure 8. The inner end of the shaft 32 is provided with an operating handle 34 which is positioned within reach of the operator of the machine.

Arranged below the pinion 33, see Figure 8, is a digger member or plow 35 provided with a vertically disposed standard 36 having its forward edge formed with a toothed rack 37 which meshes with the pinion 33. The standard 36 is interposed between the end portion 14 of the coupling member 12 and the pinion 33 and extends through the yoke-shaped part 27 of the supporting bracket. The standard 36 extends upwardly through a steadying member 38 therefor and said member 38 has its forward portion in the form of a loop, as indicated at 39 and carries an abutment 40 for the front edge of the standard 36. The steadying member 38 is pivotally connected as at 41 to the raking mechanism, see Figure 1. The digger member or plow 35 is so constructed as to project inwardly with respect to the left casting; see Figure 1.

Positioned below the left and right castings of the body portion as well as being pivotally connected therewith, is a hound 42 for the shaft 43. Whiffle trees 44 are carried by the shaft 43 and extending rearwardly therefrom is a seat post 45 provided with a seat 46, the latter is indicated in dotted lines.

The raking mechanism is carried by the left casting and is disposed at an inclination and with the inclination being inwardly and rearwardly from the outer end of said mechanism. The raking mechanism includes a rectangular frame 47 having its outer end fixed to a bracket 48 which is fixedly secured upon the inclined rear part 3 of the left casting; see Figure 1. The inner end of the frame 47, centrally thereof, is provided with a hanger 49 which depends therefrom, see Figure 2. Journaled in and extending through the inclined rear part 3 of the left casting, (see Figure 2) is a shaft 50 which is also journaled in the hanger 49, as at 51. The outer end of the shaft 50 has fixedly secured therewith a bevelled gear 52' which meshes with the gear 21 to provide for the operation of the shaft 50 during the travel of the machine. Fixedly secured to the shaft 50, so as to rotate therewith, is a pair of spaced holders or supporting elements 52, 53 and each of which is formed with a series of radially disposed arms, four in number and indicated at 54, 55, 56 and 57. The outer end of each of the arms is of circular contour as indicated at 58. Each of the circular outer ends of each arm is formed with an opening 59 centrally thereof. The openings 59 of one holder align with the openings 59 of the other holder. Journaled in each pair of aligning openings 59 is a rotatable tooth carrying bar 60 each of which carries spaced pairs of curved teeth 61 and the teeth of each pair project a substantial distance from the carrying or supporting bar 60. Each of the bars 60 projects from the carrier 53, and is provided with a diametrically extending stop pin 62, for arresting the shift of the bar toward the holder 52. Each of the bars 60 also project from the holder 52 and carries a gear wheel 63 retained in position by a head 64 on the bar 60. The gear wheel 63 is fixedly secured to its respective bar and provides means for rotating it. The gear wheels 63 are interposed between the outer faces of the arms of the holder 52 and the heads 64 on the bars 60, see Figure 2. Loosely mounted on the shaft 50 between the end part 3 of the left casting and the holder 52 is a gear wheel 65 provided with a stop lug 66 adapted to engage with a stop lug 67, formed at the inner end of the rear part 3 of the left casting, see Figure 1. The lugs 66 and 67 coact to prevent the revolving of the gear 65 on the shaft 50 and also prevent the shaft 50 rotating the gear 65 therewith. Each of the arms of the holder 52 is provided with a headed stud shaft 68 which has threaded engagement therewith. The shafts are interposed between the gears 63 and 65 and revolubly mounted on the stub shafts 68 are gears 69 which mesh with the gears 63 and 65 and provide means for operating the gears 63 which in turn will rotate the shafts 60 during the rotation of the carrier whereby the shafts 60 will be moved in a direction so that the teeth 61 will clear the frame 47 and force the plants which have been plowed or dug up towards and upon the conveyor mechanism to be presently referred to.

The rearmost corner of the frame 47 is provided with a vertically disposed sleeve 70, (see Figures 1 and 4) for the stem 71 of a yoke-shaped bracket 72, providing a carrier for a rear supporting wheel 73. The sleeve 70 provides a bearing for the stem 71 and the latter is vertically shifted, due to the unevenness of the soil, when the wheel 73 is travelling thereover. The upper end of the stem 71 is connected to a pivoted supporting arm 74 therefor and the latter has its forward end pivotally connected as at 75 to the upper end of the hanger 49.

Connected to the right casting 4 and extending rearwardly therefrom is a combined brace and support formed of an angularly disposed portion 76 and a longitudinally extending portion 77, and the latter is fixedly secured to the rear of the right casting 4. The angularly disposed arm 76 is fixedly secured to the inner end of the frame 47 and supports the same.

The conveyor mechanism is disposed transversely with respect to the line of draft of the machine and has its inner end positioned below the forward part of the inner end of the raking mechanism, as well as projecting forwardly from said inner end. The conveyor mechanism is suspended from the arm 77 of the combined supporting and bracing member. The conveyor mechanism is also braced from the arm 76 of the combined supporting and bracing member. The conveyor mechanism includes a pair of spaced, opposed side members 78, 79 which have their lower ends arranged below the raking mechanism and their upper ends projected beyond the wheel 18. The conveyor mechanism is arranged rearwardly of the wheel 18 and is upwardly curved in the direction of its length. The side member 79, near its upper end is connected to a combined brace and hanger member 80, as at 81. The member 80 is fixedly secured to the arm 76 as at 82. See Figure 1. The outer part of the member 80 is vertically disposed, as indicated at 83 Figure 5 and which opposes a vertical standard 84, see Figure 5. Connected to the arm 77 is an inverted yoke-shaped hanger 85, see Figures 1 and 5. The hanger 85 straddles the side members 78, 79 and is connected to said side members in proximity to the lower ends thereof. One of the arms of the yoke 85 opposes the standard 84, see Figure 5 and the other arm of the yoke 85 opposes the outer portion 83 of the member 80. The standard 84 at its lower end is connected to one of the arms of the member 85 by a connecting bar 86, see Figure 5. The securing means between one end of the bar 86 and one of the arms of the member 85 is indicated at 87, and which secures an upstanding slotted guide 88 in position. Journaled in the lower ends of the side members 78, 79 is an idler shaft 89, provided at each end with a sprocket pinion 90. The pinions are arranged between the side members 78, 79, as well as being spaced therefrom, see Figure 1. Journaled in the upper ends of the side members 78, 79 is an operating shaft 91 for the conveyor mechanism and which is provided near each end, with a sprocket pinion 92, see Figure 1. The shaft 91 projects from the side member 78 and is provided on such end with a bevelled pinion 93, which meshes with a bevelled pinion 94 carried by a drive shaft 95 for the shaft 91. With reference to Figure 5 the shaft 95, is journaled in a bracket 96 which extends from the arm 77 of the combined bracing and supporting member and the shaft 95 is also journaled in a bearing 97 arranged at the upper end of the standard 84. The shaft 95 intermediate its ends is provided with a sprocket pinion or gear 98, which is driven by an endless chain 99 operated from the sprocket 26 carried by the wheel 18 see Figures 1 and 7.

Travelling over the pinions 90 and 91 are sprocket chains 100 carrying an endless apron 101 see Figures 1 and 5.

Positioned below the upper end of the conveyor mechanism is the dumping carrier for receiving the plants from the conveyor mechanism and for dumping the plants in piles. The dumping carrier comprises a shaft 102 (see Figures 1 and 5) which is journaled in the part 83 of the member 80 and in the lower end of the standard 84. Fixed to the shaft 102 and extending outwardly therefrom is a series of spaced curved supporting members 103 which project a substantial distance beyond the upper end of the conveyor mechanism. One end of the shaft 102 is provided with a crank arm 104, to which is connected a pull member 105, the latter travelling through the guide 88 and connected as at 106 to the angularly disposed lower end 107, of a shifting lever 108 therefor. The lever 108 is supported from the coupling member 13, see Figure 1. A pawl and lever mechanism and rack, as indicated at 109 is associated with the lever 108 (see Figure 5) for the purpose of maintaining the lever in set position.

The raking mechanism further includes a set of depending clearer members for the pairs of teeth 61 and said members are arranged in spaced relation and indicated by the reference character 110. The clearer members 110 are disposed centrally with respect to the teeth of each pair of teeth. The clearer members 110 are semi-circular in contour and each has one end thereof secured to the forward side bar of the frame 47 and its other end secured to the rear side bar of the frame 47, as at 111, see Figures 1 and 3. The gears 63 revolve the shaft 60 so that the teeth 61 will be in the position as shown in Figure 3 or rather revolve relatively to the holder so that the teeth will always be set in the position shown in Figure 3. The members 110 may be termed shedders, as they act to shed the plants clear of the pairs of teeth during the revolving of the holders and as the teeth are maintained in the position shown in Figure 3 the plants are always raked forwardly to be taken up by the conveyor mechanism.

The machine provides means for plowing or digging up the plants after which the raking mechanism acts to force the plants in a direction toward the conveyor mechanism, and the latter picks up the plants and elevates them in a direction laterally with respect to the line of draft and discharges the plants into the dumping carrier and when the latter is dumped the plants are deposited in piles to the right of the line of draft of the machine, therefore it is thought the many advantages of a harvesting machine, in accordance with this invention, can be readily understood, and although the preferred embodiment of the invention is as illustrated and described, yet it is to be understood that changes in the details of construction can be had which will fall within the scope of the invention as claimed.

What I claim is:

1. In a harvesting machine a body portion provided with supporting wheels, a digger device arranged forwardly of and connected to one side of said body portion, a raking mechanism connected to the rear of said side and extending inwardly at a rearward inclination, and a steadying device for said digger device connected with the upper end of the latter and pivotally connected to said raking mechanism.

2. In a harvesting machine a mobile supporting structure, an inwardly extending and rearwardly inclined raker mechanism supported from the rear end of one side of said structure and driven from the latter, a delivery mechanism operated by and disposed in a plane at right angles to the travel of said structure and having its rear inner corner arranged below the forward inner corner of said raker mechanism, a supporting wheel connected to the rear inner corner of said raker mechanism, bracing means for said delivery mechanism connected thereto and to the inner end of said raker mechanism, and bracing means for said delivery mechanism connected thereto and to the other side of said structure.

In testimony whereof, I affix my signature hereto.

NORMAN E. NUNNERY.